Oct. 19, 1926.
J. C. HUFFER
LOCKING BOLT AND NUT
Filed Feb. 13, 1925
1,603,952
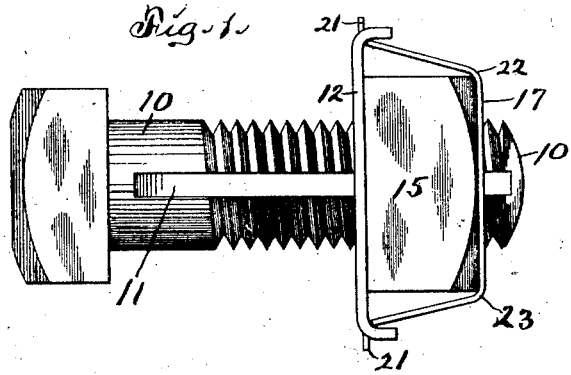
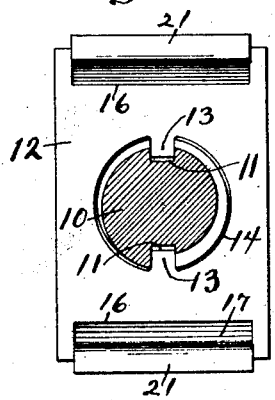
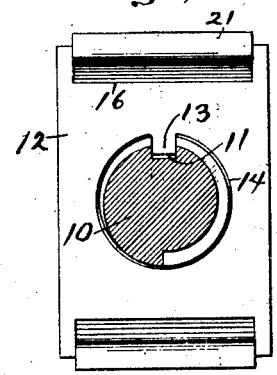
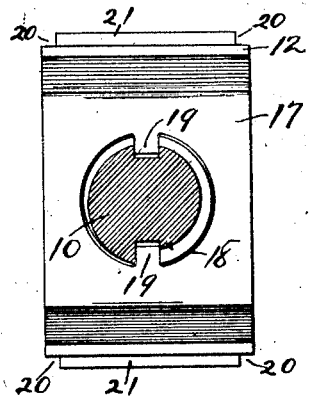
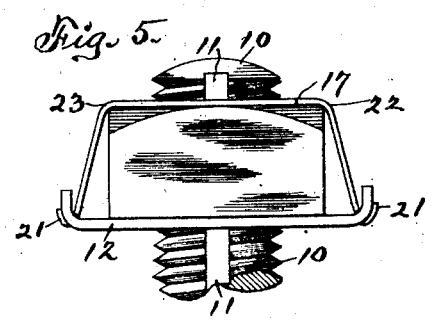
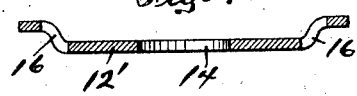
INVENTOR
John C. Huffer
BY
ATTORNEY Patented Oct. 19, 1926.

1,603,952

UNITED STATES PATENT OFFICE.

JOHN C. HUFFER, OF DENVER, COLORADO.

LOCKING BOLT AND NUT.

Application filed February 13, 1925. Serial No. 9,032.

An object of this invention is to provide improved means for locking a nut against rotation on a bolt.

A further object of this invention is to provide an improved construction for a washer.

A further object of this invention is to provide improved means for connecting a bolt, washer and nut to prevent rotation of any of them relative to another.

A further object of this invention is to provide an improved construction for a locking clip.

A further object of this invention is to provide an improved construction for a washer and a locking clip adapted for conjunctive use to prevent rotation of a nut on a bolt.

My invention consists in the construction, arrangement and combination of elements hereinafter set forth, pointed out in the claims and illustrated by the accompanying drawing, in which—

Figure 1 is a side view illustrating an assemblage of the improved devices in locking position. Figure 2 is a cross-section of the bolt showing the inner face of the washer. Figure 3 is a cross-section of the bolt showing the outer face of the locking clip and of the end portions of the washer.

Figure 4 is a cross-section similar to Figure 2, showing a single slot in the bolt and a single engaging lug on the washer.

Figure 5 is a fragmentary view, showing the operative elements as in Figure 1, with the addition of the ends of the locking clip clenched on the washer.

Figures 6 and 7 are longitudinal sections showing interchangeable forms of washer.

In the construction of the devices as shown, the numeral 10 designates a bolt formed with a longitudinal slot or groove 11 bisecting its thread and of greater depth than said thread and extending into its barrel. The bolt 10 may be formed with diametrically opposite grooves 11 as shown in Figures 2 and 3 or with only one groove as shown in Figure 4. A washer 12 is formed with one or more lugs 13 extending into its central aperture 14, each lug being of a size to slide in and fit snugly either groove 11 and prevent rotation of the washer relative to the bolt 10. The washer 12 is of a width corresponding to that of a nut 15 adapted to be screwed on the threaded portion of the bolt 10 and is of a length to extend materially beyond sides of the nut. The projecting end portions of the washer 12 are formed with transverse slots 16 and said end portions are bent outwardly, away from the head of the bolt or from an object traversed by said bolt, on lines substantially centrally of the slots. A locking clip 17 is formed of spring metal with a hole in its center adapted to receive the threaded portion of the bolt 10 freely and said clip preferably is concaved or curved on transverse lines that it may present its concave surface toward the nut 15. The clip 17 also is formed with one or more lugs 19 adapted to slide in and fit snugly either groove 11 in the bolt and prevent rotation of the clip relative to the bolt. A notch 20 is formed in each corner of the clip 17, thereby producing lips 21 on end portions of the clip. The clip 17 is bent laterally at 22, 23 on opposite sides of the hole 18, at places coinciding with angles or edges of the nut 15, and the lips 21 are further bent, in opposite directions, and extend through the slots 16 of the washer. The slots 16 of the washer are spaced from the adjacent walls of the nut 15 so that the end portions of the clip 17 may be compressed manually toward the nut to permit the lips to enter or be removed from said slots. The lips 21 may extend freely through the slots 16 as shown in Figures 1 to 4 or they may be clenched on the out-turned portions of the washer as shown in Figure 5. The end portions of the washer 12' (Fig. 7) may be bent on an ogee curve, and the extremities offset thereby into planes parallel with and outside the body. This form is more convenient at times in applying and removing the spring clip 17. The concaving of the central portion of the clip, causes it to pull outwardly slightly on the lips when in use. The notches 20 prevent endwise slipping of the clip. The clips 17 may be crimped on the outer faces, edges and corners of the nuts, thus fitting them to engage and retain hexagonal or other shaped nuts. Or, the clips may be slotted in various places to slip over and engage one or more corners of nuts. It is the function of the clip 17 to lock a nut to a washer and, through said washer, to a bolt, to retain said nut against loosening and removal accidentally from the bolt.

I claim as my invention—

1. In a locking bolt and nut device adapted to be employed with a threaded bolt having a plurality of longitudinal grooves therein and a nut adapted to be screwed on said bolt, a washer having a hole adapted to receive said bolt, said washer being formed with a plurality of lugs extending within said hole and adapted to engage said grooves slidingly, said washer being adapted to engage one face of said nut and formed with transverse slots in its ends, and a clip formed with a hole adapted to receive said bolt and also formed with a plurality of lugs extending within said hole and adapted to engage said grooves slidingly, said clip being adapted to engage the face of said nut opposite the washer, said clip having portions extending obliquely to its body and adapted to extend across opposite sides of said nut and being formed with end portions extending outwardly substantially in the plane of the inner face of said nut and adapted to engage in the slots of the washer.

2. In a device of the character described having a washer formed with transversely-slotted end portions, a clip formed of resilient material, concaved and apertured in its body and formed with a lug extending within said aperture, said clip also being formed with oblique portions formed with laterally bent end portions having notches in their corners, said end portions being adapted to extend through the slots of the washer and held therein by resilience of the oblique portions.

Signed at Denver, in the county of Denver and State of Colorado, this 5th day of February, 1925.

JOHN C. HUFFER.